United States Patent [19]

Hurni

[11] Patent Number: 4,502,391
[45] Date of Patent: Mar. 5, 1985

[54] RAILWAY TRACK WORKING MACHINE EQUIPPED WITH A DEVICE FOR BLOCKING THE SUSPENSION OF ITS AXLES

[75] Inventor: Hans Hurni, Ecublens, Switzerland

[73] Assignee: SIG Societe Industrielle, Neuhausen-Chutes du Rhin, Switzerland

[21] Appl. No.: 307,303

[22] Filed: Sep. 30, 1981

[51] Int. Cl.³ ................... B61F 5/36; E01B 27/00
[52] U.S. Cl. ..................... 105/157 R; 105/224 R; 267/3; 267/48; 280/754
[58] Field of Search ............... 105/157 R, 216, 217, 105/224 R, 224.1; 267/3, 44, 48; 280/23, 43, 704, 754, 766

[56] References Cited

U.S. PATENT DOCUMENTS

| | | | |
|---|---|---|---|
| 3,443,523 | 5/1969 | Kennedy | 105/217 X |
| 3,601,385 | 8/1971 | Senter et al. | 267/48 |
| 3,754,774 | 8/1973 | Nelson | 280/754 |
| 4,264,014 | 4/1981 | Hogg et al. | 280/754 X |

FOREIGN PATENT DOCUMENTS

| | | |
|---|---|---|
| 1131713 | 6/1962 | Fed. Rep. of Germany |
| 2913736 | 1/1980 | Fed. Rep. of Germany . |
| 1072017 | 9/1954 | France .................. 280/754 |
| 1476061 | 4/1967 | France . |
| 642248 | 7/1962 | Italy ..................... 105/216 |

*Primary Examiner*—David A. Scherbel
*Assistant Examiner*—David F. Hubbuch
*Attorney, Agent, or Firm*—Anthony J. Casella; Gerald E. Hespos

[57] ABSTRACT

A railway track working machine is equipped with a device for blocking the suspension of its axles, which device comprises, for each axle box a movable support sliding in a vertical guide fixed to the machine chassis and vertically displaced by a rod of a jack. Restoring springs ensure that the movable support bears against the rod of said jack. The movable support comprises a vertical stop, a transverse stop and two longitudinal stops intercepting during and at the end of the travel of the jack bearing members integral with the axle box in order to immobilize the latter in the vertical, transverse and longitudinal directions with respect to the chassis. This device is suitable for machines whose tools are generators of reaction forces which are capable to displace the machine chassis with respect to the railway track in the three aforementioned directions.

3 Claims, 4 Drawing Figures

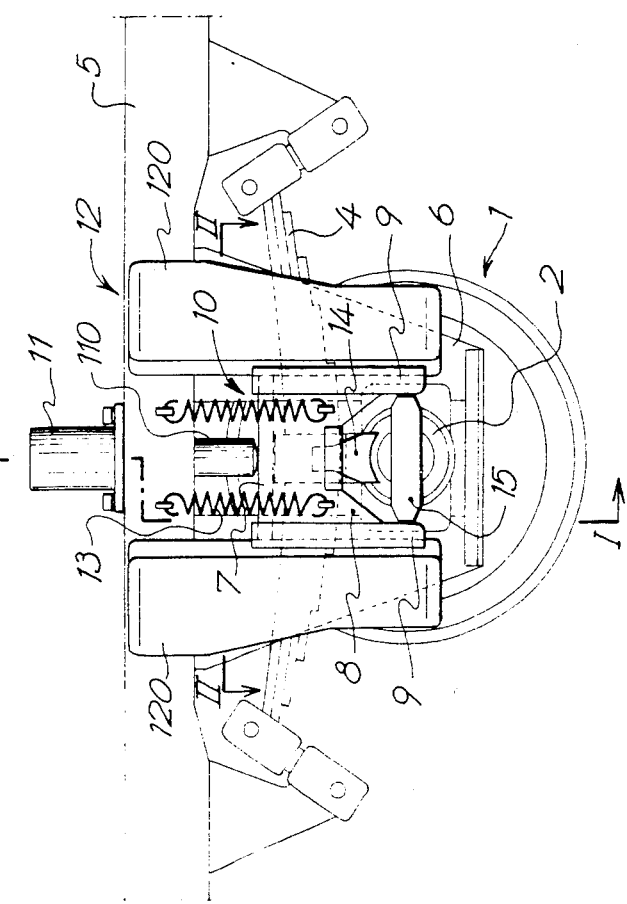
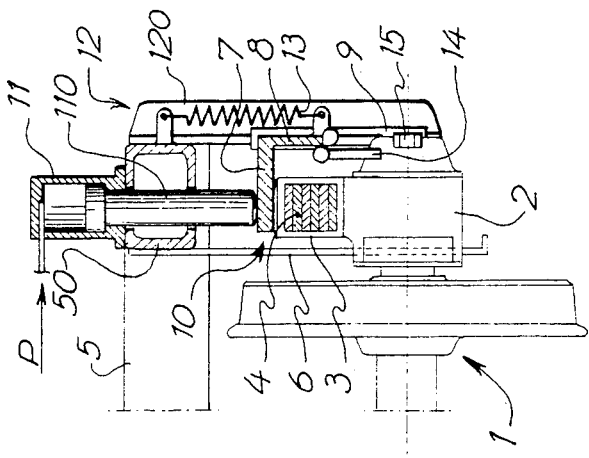
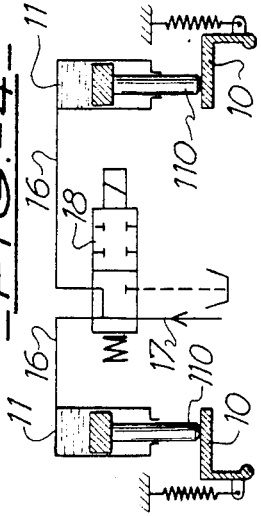
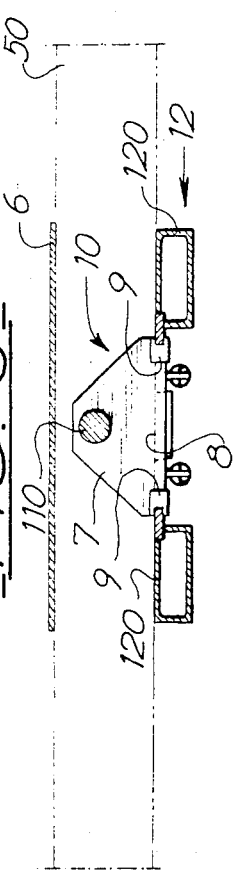

RAILWAY TRACK WORKING MACHINE EQUIPPED WITH A DEVICE FOR BLOCKING THE SUSPENSION OF ITS AXLES

This invention relates to a railway track working machine, such as for instance a tamping, levelling and lining machine, equipped with a device for blocking the suspensions of the axles which is to be put into action during the working travels in order to eliminate any variations in the position of its chassis with respect to the track, which could in particular be caused by the forces of reaction of the track to the operation of the machine tools.

Railway track tamping machines equipped with a device for suspension blocking are already known. They comprise, in the vicinity of the axle boxes and guard plates of the axles, retractable movable stops mounted on guides which are fixed relative to the machine chassis. These stops are driven by motor means in order to intercept and immobilize the axle boxes relative to the guides in the three vertical, transverse and longitudinal directions.

The tamping tools and the tools for the vertical displacement of the track used on these tamping machines bear on their chassis. The blocking of the axle suspensions in the vertical direction is useful for directly transmitting to the chassis reactions due to the lifting forces developed by these tools so as to ensure a same penetration depth of the tamping tools in the ballast beneath each sleeper or each group of sleepers tamped at each machine advance step. It also serves to prevent the chassis jumping upon each penetration impact of the tools in the ballast, which could influence the levelling of the track by retroaction of the measuring device by which these tools are controlled.

The blocking of the suspensions of the axles in the transverse direction with respect to the chassis on which are also supported tools for the transverse displacement of the track is useful for directly transmitting to the chassis the reactions due to the lining forces developed by said tools, and to prevent any lateral displacement of the chassis relative to the track and to the right of each axle, which could in this case influence the lining by retroaction of the measuring device which controls the transverse displacement tools.

Finally, for each work advance step of the tamping machine, the locking of the axle suspensions in the longitudinal direction makes it possible to prevent shocks resulting from making up the axles swinging occurring during acceleration and deceleration, whilst also permitting a better positioning of the tamping tools on either side of the sleepers or groups of sleepers to be tamped.

The arrangement of the stops for the suspension blocking device varies as a function of the tamping machine type.

In the case of old tamping machines shose axle boxes are guided in guard plates which are sufficiently rigid to ensure by themselves their immobilization in the transverse and longitudinal directions, the blocking of suspensions in the vertical direction is obtained by the crushing of suspension springs by means of a jack until a stop surmounting the axle box bears against the machine chassis.

This solution cannot be used on modern tamping machines having to ensure rapid displacements when running light, because on such machines the guard plates must be flexible and must have sufficient clearances around the axle boxes in both the transverse and longitudinal directions, in order to ensure an adequate swinging of the axle in said two directions and an elastic response to transverse shocks. On such tamping machines, the blocking of the suspensions in the vertical and transverse directions is obtained by two stops integral with a support pivoting in a transverse vertical plane above each axle box, said support being articulated on a bearing fixed to the machine chassis. The pivoting of this support is controlled by a first jack. During this pivoting, one of the two stops carried by this support bears on the axle box and moves it downwards away from the chassis in order to take up again part of the load of the springs until it is immobilized at the end of the travel of said first jack. At this instant, the other stop laterally contacts the axle wheel rim or, in another construction, a bearing member fixed to the axle box. Blocking in the longitudinal direction is obtained by the action of a second jack which bears on a member fixed to the axle box in order to immobilize the latter against one of the two sides of the vertical guide of the flexible guard plate or, in another known construction, by means of a pivoting bracket which intercepts and immobilizes in this direction the motor-driven axle transmission bridge.

In the case of tamping machines with two axles, when their wheel base and rigidity of the chassis are too great to ensure, with the suspensions blocked, the bearing of the four wheels on a track section having transverse inclination variations between the individual axles during the working advance, the blocking device for the suspensions of one of these axles and preferably the front axle, i.e. the axle located in an area of untreated track, has two special fixtures in order to still ensure the necessary bearing action.

In one of these fixtures, the blocking device is mounted not in conjunction with the machine chassis, but with a transversely articulated intermediate frame on which the axle is mounted. The two ends of this intermediate frame are connected to the machine chassis by two supplementary single-acting jacks, whose chambers are connected by a pipe permitting the free pivoting of the axle during each advance by one working step. When working, this pipe is sealed in order to block the frame with the slope angle reached.

In the other fixture of the suspension blocking device, the two vertical blocking jacks of the axle suspensions in question are connected by a pipe of the above indicated type in order to obtain the same effects, without using an articulated intermediate frame.

These blocking devices for the suspensions of known tamping machines are satisfactory, but they require the installation of at least two independent mechanisms and/or involve the use of the guard plates in order to ensure the immobilization of each axle box in the three directions.

The present invention aims to obviate these disadvantages in order to ensure greater reliability of the devices for blocking the suspensions of railway track working machines, and more particularly modern tamping machines with two axles whose suspensions are as flexible as possible in order to allow rapid travel and whose chassis is constructed in accordance with maximum rigidity criteria in order to cope with the ever increasing forces required of track displacement tools.

According to the invention, there is provided a railway track working machine equipped with a device for blocking the suspensions of its axles incorporating, in the vicinity of the axle boxes and guard plates of said axles, retractable movable stops mounted on guides which are fixed relative to the chassis of the machine and driven by motor means for intercepting and immobilizing the axle boxes relative to said guides in the vertical, transverse and longitudinal directions during work travels, wherein the vertical, lateral and longitudinal immobilization stops of each axle box are rigidly mounted on a single common movable support driven by a single motor means and engaged on a single guide which is independent of the guard plate and rigidly fixed to the said chassis.

In this way, a single mechanism ensures the tridirectional immobilization of each axle box and the guard plates no longer have to participate in said immobilization. The single guide bearing and conditioning the displacement for the common support of the vertical, transverse and longitudinal stops of each axle box can be designed as rigidly as desired, as a function of the forces to be overcome, because said guide is independent of the guard plates.

The invention will now be further described, by way of example, with reference to the drawings, in which:

FIG. 1 is an elevation of one embodiment of a device according to the invention;

FIG. 2 is a section taken along the line I—I in FIG. 1 in the direction of the arrows;

FIG. 3 is a section taken along the line II—II in FIG. 1 in the direction of the arrows; and FIG. 4 is a representative diagram of a variant of the device according to the invention.

The suspension blocking device shown is installed on a conventional axle 1, which permits rapid movements on the track and whose axle boxes 2 are surmounted by a bracket 3 in which are contained the leaf springs 4 of its suspension connecting it to the chassis 5 of a railway track working machine. For reference purposes, the latter can be considered as a tamping, levelling and lining machine having two axles between which are installed tools generating vertical, transverse and longitudinal reaction forces when working.

The vertical, transverse and longitudinal elastic swinging of the axle 1 relative to the chassis 5 are conditioned and limited at each axle box 2 and in a conventional manner by means of a flexible guard plate 6.

Installed in the vicinity of each axle box 2, the suspension blocking device has a common movable support 10 driven by a motor means 11 and engaged on a guide 12 which is independent of the guard plate 6 and fixed rigidly to the chassis 5. The support 10 has a vertical stop 7, a transverse stop 8 and two longitudinal stops 9.

The guide 12 is formed by two vertical posts 120 arranged on either side of the axle box 2 in the longitudinal direction of the chassis 5. The facing inner edges of these two posts form a vertical slide in which the movable support 10 slides. These two posts are rigidly fixed, e.g. by welding, to the outer wall of the side girder 50 of the chassis 5.

The support 10 is constituted by two plates at right angles, namely a vertical plate forming the transverse stop 8 and a horizontal plate forming the vertical stop 7. The vertical plate 8 is bordered by two vertical slides engaged with the two edges of the guide 12 and forming the longitudinal stops 9.

The motor means 11 comprises a single-acting hydraulic jack fixed in the vertical position to the side girder 50 of the chassis 5, and the vertical stop 7 of the support 10 bears against the rod 110 of its piston. This bearing action is ensured by two restoring springs 13 connecting the support to the side girder.

In the operating position shown, the piston of the jack 11 is at the end of its travel. The vertical stop 7 of the movable support 10 bears against the bracket 3 gripping the suspension springs 4 with a jack thrust which is adequate for absorbing, for example, between a third and a half of their normal load due to the weight of the machine. As the bracket 3 is integral with the axle box 2, the latter is consequently immobilized in the vertical direction. In said end of travel position of the jack 11, the transverse stop 8 of the movable support 10 laterally bears against a bearing member 14 fixed to the axle box 2 and the two longitudinal stops 9 of said support envelope a second bearing member 15, which is also fixed to the axle box 2. Thus, the axle box 2 is also immobilized in the transverse and longitudinal directions, and the transverse immobilization in opposed directions is obtained by the cooperation of the transverse stop 8 of the blocking device of the suspension of the other axle box 2 of the same axle which is not shown because it is identical.

On releasing the pressure of the jack 11, the axle box 2 and movable support 10 assembly rises until suspension springs 4 again have their normal load. The movable support 10 then continues to rise under the action of the restoring spring 13 up to the end of travel of the jack 11, whilst releasing its stops 7, 8 and 9 respectively from the bracket 3 and the bearing members 14 and 15 fixed to the axle box 2. The latter is thus freed from its immobilization in the three vertical, transverse and longitudinal directions within the limits permitted by the clearances existing between it and the guard plate 6.

The present device can be used on the two axles of a tamping machine with a sufficiently short wheel base and/or a chassis which is sufficiently elastic to ensure, with the suspensions blocked, the bearing of its four wheels on a track section on which transverse inclination variations exist between the machine axles during the working advance.

In the case of a tamping machine with a large wheel base and/or a chassis which is too rigid to ensure the said bearing action, the two jacks 11 of the device for blocking the suspensions of one of its two axles, preferably the front axle, can be arranged, in the manner diagrammatically shown in FIG. 4, so as to have a larger travel and with supply pipes 16 connected to the feed circuit 17 via a two-position electro-valve 18 with spring return. As a result, the chambers of these two jacks may be interconnected, as may be seen in the represented position of the core of the said valve, or the two pipes 16 may be sealed in the other position of said care. Thus, during the advance by one work step, the supply pipe 16 of the two jacks 11 can be connected so as to permit the free passage of pressurized fluid from one chamber of a jack to that of the other, thus permitting the free vertical pivoting of the axle equipped with this special fixture relative to the machine chassis which is locked against the other axle. During stationary working, the sealing of the pipes 16 makes it possible to block the axle with the slope occurring at the end of the work step.

In this special fixture, the height of the chamber of the jacks 11 is determined in such a way that at the selected working pressure, the pistons of these jacks are kept sufficiently remote from the end of their downward travel to permit the necessary pivoting of the axle.

Obviously, the shapes of the structures of the device shown will be adapted to the type of suspension to be blocked which can, for example, have coil springs instead of leaf springs.

The mobility of the common support 10 of the vertical, transverse and longitudinal immobilization stops of the axle box 2 can be differently conceived. For example, this support can be mounted so as to pivot in a transverse vertical plane on a bracket support which serves as a guide fixed beneath the chassis 5 above the wheel, the stops intercepting the corresponding bearing members of the axle box 2 at the end of the pivoting travel of said support. When there is an adequate lateral free space facing each axle box, the common support of the stops can be slidingly mounted in a horizontal guide, the stops intercepting at the end of the horizontal translation the corresponding bearing members of the axle box.

I claim:

1. A railway track working machine having a chassis, wheeled axles for rolling on the railway track, suspension means for supporting the chassis, a plurality of axle box means for connecting said wheeled axles to said suspension means, a guard plate for each of said axle box means, and a device for blocking the suspension means of said wheeled axles comprising, for each said axle box means:
    (a) one single guide rigidly fixed to said chassis in the vicinity of said axle box means, said single guide being independent of the guard plate;
    (b) one single movable support mounted on said single guide for movement towards and away from said axle box means; and
    (c) one single motor member in communication with said single movable support for driving said single movable support into a blocking position abutting at least a portion of said axle box means, whereby in the blocking position, the single movable support cooperates with the axle box means and the single guide for immobilizing the axle box means in the vertical, transverse and longitudinal directions.

2. A railway track working machine according to claim 1, wherein said single guide is formed by a vertical slideway in which said single movable support is slidably mounted.

3. A railway track working machine according to claim 2, wherein said vertical slideway comprises two vertical posts, wherein the single movable support comprises a vertical plate which is bordered by two slides engaging the two posts of the slideway and a horizontal plate, wherein said vertical plate, said two slides and said horizontal plate respectively form a transverse stop, longitudinal stops and a vertical stop for said axle box means, wherein the single motor member comprises a single-acting hydraulic jack having a piston rod which forces the single movable support into the blocking position when the jack is actuated, said railway track working machine further including spring means in communication with said single movable support and the machine chassis for withdrawing said single movable support from the blocking position when the piston rod is retracted, and wherein the axle box means comprises bearing means adapted to be intercepted by said transverse, longitudinal and vertical stops of the single movable support.

* * * * *